(12) United States Patent
Chang et al.

(10) Patent No.: US 6,518,448 B2
(45) Date of Patent: Feb. 11, 2003

(54) COMPOUNDS USEFUL FOR CONTROL AGENTS FOR LIVING-TYPE FREE RADICAL POLYMERIZATION

(75) Inventors: Han Ting Chang, Livermore, CA (US); Dominique Charmot, Los Gatos, CA (US); Yunxiao Li, San Jose, CA (US)

(73) Assignee: Symyx Technologies, Inc., Santa Clara, CA (US)

( * ) Notice: Subject to any disclaimer, the term of this patent is extended or adjusted under 35 U.S.C. 154(b) by 0 days.

(21) Appl. No.: 09/963,174

(22) Filed: Sep. 25, 2001

(65) Prior Publication Data

US 2002/0058771 A1 May 16, 2002

Related U.S. Application Data

(62) Division of application No. 09/676,267, filed on Sep. 28, 2000.

(51) Int. Cl.[7] .......................... C07C 333/00; C08F 4/00
(52) U.S. Cl. ...................... 558/233; 558/235; 526/219; 526/220
(58) Field of Search ................. 558/233, 235; 526/219, 220

(56) References Cited

U.S. PATENT DOCUMENTS

| | | | |
|---|---|---|---|
| 3,580,830 A | 5/1971 | Siebert et al. | 204/159.24 |
| 4,853,483 A | * 8/1989 | Bright | 558/235 |
| 5,089,601 A | 2/1992 | Ozoe et al. | 528/390 |
| 5,314,962 A | 5/1994 | Otsu et al. | 525/280 |
| 5,356,947 A | 10/1994 | Ali et al. | 522/57 |
| 6,153,705 A | 11/2000 | Corpart et al. | 525/244 |
| 6,265,499 B1 | * 7/2001 | Nagino et al. | 526/220 |

FOREIGN PATENT DOCUMENTS

| | | | |
|---|---|---|---|
| WO | WO 98/01478 | 1/1998 | C08F/2/38 |
| WO | WO 98/58974 | 12/1998 | C08F/293/00 |
| WO | WO 99/05099 | 2/1999 | C07C/327/36 |
| WO | WO 99/31144 | 6/1999 | C08F/2/38 |
| WO | WO 99/35177 | 7/1999 | C08F/293/00 |

OTHER PUBLICATIONS

Otsu et al., 1998, *Advances in Polymer Science*, vol.:136, pp. 75–137 "Controlled Synthesis of Polymers Using the Iniferter Technique: Developments In Living Radical Polymerization".

Castro et al., 1984, *J. Org. Chem* vol. 49: 863–866 "Kinetics and Mechanism of the Addition of Amines to Carbon Disulfide in Ethanol".

*Journal of Polymer Science: Part A: Polymer Chemistry*, vol. 38, 3864–3874, 2000.

*Journal of Polymer Science: Part A: Polymer Chemistry*, vol. 38, 4206–4217, 2000.

*Macromolecular Symposia*, 2000, 150, 23.

Houben–Weyl, *Methoden der organischen Chemie*, vol. XIV/1, Makromolekulare Stoffe, Georg–Thieme–Verlag, Stuttgart, 1961, pp. 192–208.

Houben–Weyl, *Methoden der organischen Chemie*, vol. XIV/1, Makromolekulare Stoffe, Georg–Thieme–Verlag, Stuttgart, 1961, pp. 411–420.

\* cited by examiner

*Primary Examiner*—James J. Seidleck
*Assistant Examiner*—Olga Asinovsky

(57) ABSTRACT

Control agents that have a nitrogen-nitrogen bond covalently bonded to a thiocarbonyl moiety are provided for living-type free radical polymerization of a wide variety of monomers. These control agents provide superior properties for control of the polymerization and/or the properties of the polymers obtained and/or the monomers that may be polymerized. In some embodiments, a bulky group is pendant off the activated thiocarbonyl portion of the control agents. Multifunctional control agents provide the opportunity for a variety of structurally unique polymers, including block copolymers, stars and hyper-branched polymers.

4 Claims, No Drawings

COMPOUNDS USEFUL FOR CONTROL AGENTS FOR LIVING-TYPE FREE RADICAL POLYMERIZATION

FIELD OF THE INVENTION

The present invention relates to new compounds useful in assisting in the polymerization of monomers in a free radical polymerization that has living-type kinetics. Polymers made with the control agents and processes for polymerization are also included. In addition, some of the compounds themselves are novel.

BACKGROUND OF THE INVENTION

The use and mechanism of control agents for free radical polymerization is now generally known, see for example WO98/01478, WO99/35177, WO99/31 144, and WO98/58974, each of which is incorporated herein by reference. Despite this knowledge, no successful commercialization of a polymerization process has occurred with these agents. Thus the need for new agents, which lead to a commercializable process are needed.

In addition, the previously known control agents have limited uses. Although touted as universally useful, those of skill in the art appreciate that a particular control agent is particularly useful for the control of particular monomers and monomer mixtures. The polymerization conditions under which particular control agents are particularly useful are generally not well known. Thus, a need exists for a family of related control agents that can be easily synthesized and modified so that a control agent will be readily available for polymerizing desired monomers under commercially acceptable conditions, which include high conversion at the shortest possible reaction times and lower temperatures.

This invention solves these issues by providing control agents that can be easily modified for particular monomers and monomer mixtures. The control agents of the present invention contain at least one nitrogen-nitrogen bond, which allows for simpler modification of the electronic and steric nature of the control agents as compared to known control agents. These modified properties allow for improved conditions of the polymerization process and/or improved properties of the polymers obtained from the processes.

SUMMARY OF THE INVENTION

This invention provides control agents that are easy to prepare and economically useful on a commercial scale. In particular, the control agents of this invention have a nitrogen-nitrogen bond, which is believed to provide better chemical stability of the control agent together with a greater flexibility for chemical modification of said control agents, while giving control of a polymerization reaction that includes a free radical.

In general, the control agents of this invention have a N—N bond covalently bonded to a thiocarbonyl moiety. In some embodiments the control agents can be characterized by the general formula:

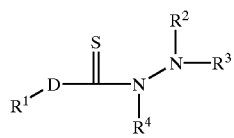

(I)

wherein D is S, Te or Se; $R^1$ is generally any group that is sufficiently labile to be expelled as its free radical form; $R^2$ and $R^3$ are each independently selected from the group consisting of hydrogen, hydrocarbyl, substituted hydrocarbyl, heteroatom-containing hydrocarbyl, and substituted heteroatom-containing hydrocarbyl, and combinations thereof, and $R^4$ is selected from the group consisting of hydrogen, hydrocarbyl, substituted hydrocarbyl, heteroatom-containing hydrocarbyl, and substituted heteroatom-containing hydrocarbyl, and combinations thereof; and optionally, $R^4$ combines with $R^2$ to form a ring structure, with said ring having from 3 to 50 non-hydrogen atoms. In some embodiments, $R^2$ can form a ring structure with $R^1$, as discussed herein.

Another aspect of this invention is directed toward multifunctional control agents, so that the control agents may occupy either a central portion of a polymer chain and/or two or more ends of a polymer. In those embodiments where the control agent occupies a central portion of the polymer backbone, the nitrogen-nitrogen bond provides the unique opportunity to degrade the polymer backbone into smaller pieces by external stimuli (e.g., heat, chemical reaction, irradiation, etc.). Such a process is unique as compared to known free radical polymerization and "living" free radical polymerization techniques. In addition, some of the multifunctional control agents are cyclic, which provide the unique opportunity to prepare block copolymers with reduced processes steps. Furthermore, some multifunctional control agents allow for ring opening polymerizations, which heretofore have not found commercial applications in free radical polymerization.

Other aspects of this invention include certain of the control agents, which are novel compounds. Polymerization processes using all of the control agents of this invention and polymers that can be made with the control agents of this invention are additional aspects of this invention. In particular, the control agents of this invention provide living-type kinetics and as such allow for the preparation of desired products, including block polymers, star architectures, grafts and hyperbranched polymers.

Thus, it is an object of this invention to provide novel control agents for a living-type free radical polymerization process.

It is another object of this invention to provide novel compounds, which are useful as control agents in a free radical polymerization process.

It is a further object of this invention to provide a novel system for free radical polymerization of monomers that employs living-type kinetics.

It is still a further object of this invention to polymerize a variety of monomers under commercially acceptable conditions with a family of control agents.

It is yet a further object of this invention to make controlled architecture polymers with a polymerization process that employs a control agent.

It is further another object of this invention to provide multifunctional control agents that may occupy a central portion of a polymer chain allowing for the polymer chain to be degraded.

Further aspects and objects of this invention will be evident to those of skill in the art upon review of this specification.

DETAILED DESCRIPTION OF THE INVENTION

In the most general terms, the control agents of this invention contain at least one $N^1$—$N^2$ bond covalently bonded to a thiocarbonyl group. In structural terms, the following moiety must be present in the control agents of this invention:

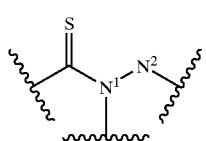
(I')

In some embodiments, a sulfur atom is attached to the thiocarbonyl group, leading to a dithiocarbonyl moiety. This may be referred to herein as the "dithiocarbazate" group or N—NC(=S)S moiety, however, such terminology is not intended to be limiting. Also, in some embodiments, the substituents of $N^2$ (other than $N^1$) should not form a heterocycle that includes $N^2$.

In describing and claiming the present invention, the following terminology will be used in accordance with the definitions set out below. A named R group will generally have the structure that is recognized in the art as corresponding to R groups having that name. For the purposes of illustration, representative R groups as enumerated above are defined herein. These definitions are intended to supplement and illustrate, not preclude, the definitions known to those of skill in the art.

It is also to be understood that the terminology used herein is for the purpose of describing particular embodiments only, and is not intended to be limiting. As used in this specification and the appended claims, the singular forms "a," "an" and "the" include plural referents unless the context clearly dictates otherwise. In describing and claiming the present invention, the following terminology will be used in accordance with the definitions set out below.

The following definitions pertain to chemical structures, molecular segments and substituents:

As used herein, the phrase "having the structure" is not intended to be limiting and is used in the same way that the term "comprising" is commonly used. The term "independently selected from the group consisting of" is used herein to indicate that the recited elements, e.g., R groups or the like, can be identical or different (e.g., $R^2$ and $R^3$ in the structure of formula (1) may all be substituted alkyl groups, or $R^2$ may be hydrido and $R^3$ may be methyl, etc.).

"Optional" or "optionally" means that the subsequently described event or circumstance may or may not occur, and that the description includes instances where said event or circumstance occurs and instances where it does not. For example, the phrase "optionally substituted hydrocarbyl" means that a hydrocarbyl moiety may or may not be substituted and that the description includes both unsubstituted hydrocarbyl and hydrocarbyl where there is substitution.

The term "alkyl" as used herein refers to a branched or unbranched saturated hydrocarbon group typically although not necessarily containing 1 to about 24 carbon atoms, such as methyl, ethyl, n-propyl, isopropyl, n-butyl, isobutyl, t-butyl, octyl, decyl, and the like, as well as cycloalkyl groups such as cyclopentyl, cyclohexyl and the like. Generally, although again not necessarily, alkyl groups herein contain 1 to about 12 carbon atoms. The term "lower alkyl" intends an alkyl group of one to six carbon atoms, preferably one to four carbon atoms. "Substituted alkyl" refers to alkyl substituted with one or more substituent groups, and the terms "heteroatom-containing alkyl" and "heteroalkyl" refer to alkyl in which at least one carbon atom is replaced with a heteroatom.

The term "alkenyl" as used herein refers to a branched or unbranched hydrocarbon group typically although not necessarily containing 2 to about 24 carbon atoms and at least one double bond, such as ethenyl, n-propenyl, isopropenyl, n-butenyl, isobutenyl, octenyl, decenyl, and the like. Generally, although again not necessarily, alkenyl groups herein contain 2 to about 12 carbon atoms. The term "lower alkenyl" intends an alkenyl group of two to six carbon atoms, preferably two to four carbon atoms. "Substituted alkenyl" refers to alkenyl substituted with one or more substituent groups, and the terms "heteroatom-containing alkenyl" and "heteroalkenyl" refer to alkenyl in which at least one carbon atom is replaced with a heteroatom.

The term "alkynyl" as used herein refers to a branched or unbranched hydrocarbon group typically although not necessarily containing 2 to about 24 carbon atoms and at least one triple bond, such as ethynyl, n-propynyl, isopropynyl, n-butynyl, isobutynyl, octynyl, decynyl, and the like. Generally, although again not necessarily, alkynyl groups herein contain 2 to about 12 carbon atoms. The term "lower alkynyl" intends an alkynyl group of two to six carbon atoms, preferably three or four carbon atoms. "Substituted alkynyl" refers to alkynyl substituted with one or more substituent groups, and the terms "heteroatom-containing alkynyl" and "heteroalkynyl" refer to alkynyl in which at least one carbon atom is replaced with a heteroatom.

The term "alkoxy" as used herein intends an alkyl group bound through a single, terminal ether linkage; that is, an "alkoxy" group may be represented as —O-alkyl where alkyl is as defined above. A "lower alkoxy" group intends an alkoxy group containing one to six, more preferably one to four, carbon atoms. The term "aryloxy" is used in a similar fashion, with aryl as defined below.

Similarly, the term "alkyl thio" as used herein intends an alkyl group bound through a single, terminal thioether linkage; that is, an "alkyl thio" group may be represented as —S-alkyl where alkyl is as defined above. A "lower alkyl thio" group intends an alkyl thio group containing one to six, more preferably one to four, carbon atoms.

The term "allenyl" is used herein in the conventional sense to refer to a molecular segment having the structure —CH=C=CH$_2$. An "allenyl" group may be unsubstituted or substituted with one or more non-hydrogen substituents.

The term "aryl" as used herein, and unless otherwise specified, refers to an aromatic substituent containing a single aromatic ring or multiple aromatic rings that are fused together, linked covalently, or linked to a common group such as a methylene or ethylene moiety. The common linking group may also be a carbonyl as in benzophenone, an oxygen atom as in diphenylether, or a nitrogen atom as in diphenylamine. Preferred aryl groups contain one aromatic ring or two fused or linked aromatic rings, e.g., phenyl, naphthyl, biphenyl, diphenylether, diphenylamine, benzophenone, and the like. In particular embodiments, aryl substituents have 1 to about 200 carbon atoms, typically 1 to about 50 carbon atoms, and preferably 1 to about 20 carbon atoms. "Substituted aryl" refers to an aryl moiety substituted with one or more substituent groups, (e.g., tolyl, mesityl and perfluorophenyl) and the terms "heteroatom-containing aryl" and "heteroaryl" refer to aryl in which at least one carbon atom is replaced with a heteroatom.

The term "aralkyl" refers to an alkyl group with an aryl substituent, and the term "aralkylene" refers to an alkylene group with an aryl substituent; the term "alkaryl" refers to an aryl group that has an alkyl substituent, and the term "alkarylene" refers to an arylene group with an alkyl substituent.

The terms "halo" and "halogen" are used in the conventional sense to refer to a chloro, bromo, fluoro or iodo substituent. The terms "haloalkyl," "haloalkenyl" or "haloalkynyl" (or "halogenated alkyl," "halogenated alkenyl," or "halogenated alkynyl") refers to an alkyl, alkenyl or alkynyl group, respectively, in which at least one of the hydrogen atoms in the group has been replaced with a halogen atom.

The term "heteroatom-containing" as in a "heteroatom-containing hydrocarbyl group" refers to a molecule or molecular fragment in which one or more carbon atoms is replaced with an atom other than carbon, e.g., nitrogen, oxygen, sulfur, phosphorus or silicon. Similarly, the term "heteroalkyl" refers to an alkyl substituent that is heteroatom-containing, the term "heterocyclic" refers to a cyclic substituent that is heteroatom-containing, the term "heteroaryl" refers to an aryl substituent that is heteroatom-containing, and the like. When the term "heteroatom-containing" appears prior to a list of possible heteroatom-containing groups, it is intended that the term apply to every member of that group. That is, the phrase "heteroatom-containing alkyl, alkenyl and alkynyl" is to be interpreted as "heteroatom-containing alkyl, heteroatom-containing alkenyl and heteroatom-containing alkynyl,"

"Hydrocarbyl" refers to univalent hydrocarbyl radicals containing 1 to about 30 carbon atoms, preferably 1 to about 24 carbon atoms, most preferably 1 to about 12 carbon atoms, including branched or unbranched, saturated or unsaturated species, such as alkyl groups, alkenyl groups, aryl groups, and the like. The term "lower hydrocarbyl" intends a hydrocarbyl group of one to six carbon atoms, preferably one to four carbon atoms. "Substituted hydrocarbyl" refers to hydrocarbyl substituted with one or more substituent groups, and the terms "heteroatom-containing hydrocarbyl" and "heterohydrocarbyl" refer to hydrocarbyl in which at least one carbon atom is replaced with a heteroatom.

By "substituted" as in "substituted hydrocarbyl," "substituted aryl," "substituted alkyl," "substituted alkenyl" and the like, as alluded to in some of the aforementioned definitions, is meant that in the hydrocarbyl, hydrocarbylene, alkyl, alkenyl or other moiety, at least one hydrogen atom bound to a carbon atom is replaced with one or more substituents that are functional groups such as hydroxyl, alkoxy, thio, phosphino, amino, halo, silyl, and the like. When the term "substituted" appears prior to a list of possible substituted groups, it is intended that the term apply to every member of that group. That is, the phrase "substituted alkyl, alkenyl and alkynyl" is to be interpreted as "substituted alkyl, substituted alkenyl and substituted alkynyl." Similarly, "optionally substituted alkyl, alkenyl and alkynyl" is to be interpreted as "optionally substituted alkyl, optionally substituted alkenyl and optionally substituted alkynyl,"

As used herein the term "silyl" refers to the $-SiZ^1Z^2Z^3$ radical, where each of $Z^1$, $Z^2$, and $Z^3$ is independently selected from the group consisting of hydrido and optionally substituted alkyl, alkenyl, alkynyl, aryl, aralkyl, alkaryl, heterocyclic, alkoxy, aryloxy and amino.

As used herein, the term "phosphino" refers to the group $-PZ^1Z^2$, where each of $Z^1$ and $Z^2$ is independently selected from the group consisting of hydrido and optionally substituted alkyl, alkenyl, alkynyl, aryl, aralkyl, alkaryl, heterocyclic and amino.

The term "amino" is used herein to refer to the group $-NZ^1Z^2$, where each of $Z^1$ and $Z^2$ is independently selected from the group consisting of hydrido and optionally substituted alkyl, alkenyl, alkynyl, aryl, aralkyl, alkaryl and heterocyclic.

The term "thio" is used herein to refer to the group $-SZ^1$, where $Z^1$ is selected from the group consisting of hydrido and optionally substituted alkyl, alkenyl, alkynyl, aryl, aralkyl, alkaryl and heterocyclic.

As used herein all reference to the elements and groups of the Periodic Table of the Elements is to the version of the table published by the Handbook of Chemistry and Physics, CRC Press, 1995, which sets forth the new IUPAC system for numbering groups.

This invention provides novel compounds and control agents useful for the control of free radical polymerization reactions. In general a free radical polymerization is carried out with these control agents by creating a mixture of at least one polymerizable monomer, the control agent and optionally at least one source of free radicals, e.g., an initiator. The source of free radicals is optional because some monomers may self-initiate upon heating. After or upon forming the polymerization mixture, the mixture is subjected to polymerization conditions. Polymerization conditions are those conditions that cause the at least one monomer to form at least one polymer, as discussed herein, such as temperature, pressure, atmosphere, ratios of starting components used in the polymerization mixture, reaction time or external stimuli of the polymerization mixture.

Control Agents

Generally, the control agents of this invention may be characterized by the general formula (I') above. More specifically, the control agents of this invention may be characterized by the general formula:

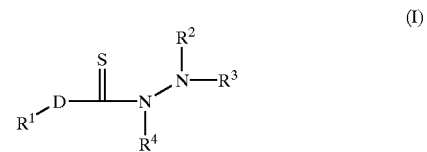
(I)

wherein D is S, Te or Se. Preferably, D is sulfur. $R^1$ is generally any group that can be easily expelled under its free radical form ($R^1\bullet$) upon an addition-fragmentation reaction, as depicted below in Scheme 1 (showing D as S):

Scheme 1

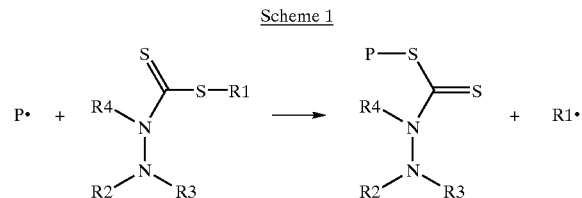

In Scheme 1, P• is a free radical, typically a macro-radical, such as polymer chain. More specifically, $R^1$ is selected from the group consisting of hydrocarbyl, substituted hydrocarbyl, heteroatom-containing hydrocarbyl, and substituted heteroatom-containing hydrocarbyl, and combinations thereof. Even more specifically, $R^1$ is selected from the group consisting of optionally substituted alkyl, optionally substituted aryl, optionally substituted alkenyl, optionally substituted alkoxy, optionally substituted heterocyclyl, optionally substituted alkylthio, optionally substituted amino and optionally substituted polymer chains. And still more specifically, $R^1$ is selected from the group consisting of $-CH_2Ph$, $-CH(CH_3)CO_2CH_2CH_3$, $-CH(CO_2CH_2CH_3)_2$, $-C(CH_3)_2CN$, $-CH(Ph)CN$ and $-C(CH_3)_2Ph$.

Also, $R^2$ and $R^3$ are each independently selected from the group consisting of hydrogen, hydrocarbyl, substituted hydrocarbyl, heteroatom-containing hydrocarbyl, and substituted heteroatom-containing hydrocarbyl, and combinations thereof. More specifically, $R^2$ and $R^3$ may be each independently selected from the group consisting of hydrogen, optionally substituted alkyl, optionally substituted aryl, optionally substituted alkenyl, optionally substituted acyl, optionally substituted, aroyl, optionally substituted alkoxy, optionally substituted heteroaryl, optionally substituted heterocyclyl, optionally substituted alkylsulfonyl, optionally substituted alkylsulfinyl, optionally substituted alkylphosphonyl, optionally substituted arylsulfinyl, and optionally substituted arylphosphonyl. Specific embodiments of $R^2$ and/or $R^3$ are listed in the above definitions, and in addition include perfluorenated aromatic rings, such as perfluorophenyl. Also optionally, $R^2$ and $R^3$ can together form a double bond alkenyl moiety off the nitrogen atom, and in that case $R^2$ and $R^3$ are together optionally substituted alkenyl moieties.

Finally, $R^4$ is selected from the group consisting of hydrogen, hydrocarbyl, substituted hydrocarbyl, heteroatom-containing hydrocarbyl, and substituted heteroatom-containing hydrocarbyl, and combinations thereof; and optionally, $R^4$ combines with $R^2$ and/or $R^3$ to form a ring structure, with said ring having from 3 to 50 non-hydrogen atoms. In particular, $R^4$ is selected from the group consisting of hydrogen, optionally substituted alkyl, optionally substituted aryl, optionally substituted alkenyl, optionally substituted acyl, optionally substituted aroyl, amino, thio, optionally substituted aryloxy and optionally substituted alkoxy. Preferred $R^4$ groups include methyl and phenyl.

In a more specific embodiment, a bulky moiety is attached to the $N^1$ nitrogen atom, which in some embodiments may be characterized by the general formula:

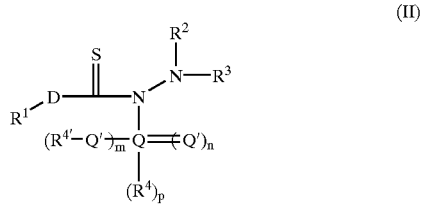

(II)

wherein D and $R^1$—$R^4$ are as defined above and Q is selected from the group consisting of carbon, sulfur and phosphorus (C, S and P); Q' is selected from the group consisting of oxygen and sulfur (O and S); $R^{4'}$ is typically selected from the same group as $R^4$; and n, m and p are each either 0, 1 or 2 to satisfy the valency of Q. Thus, for example, when Q is carbon, n and p may both be 1 and m is 0. Another example for when Q is carbon is that n is 1 and m is 1 and p is 0. Also for example, when Q is phosphorus, n is 1 and m is 2. Also for example, when Q is sulfur, n is 1 or 2, but typically 2; and m is typically 0 and p is 1. In some preferred embodiments, Q is carbon or sulfur and Q' is oxygen. In these preferred embodiments, $R^4$ and $R^{4'}$ are each independently more preferably selected from the group consisting of optionally substituted alkyl and optionally substituted aryl.

In some embodiments within formulas (I) and (II), above, $R^2$ and/or $R^3$ may be independently selected from —Q(=Q')$_n$(R$^{4'}$—Q')$_m$(R$^4$)$_p$, which is the moiety from the $N^1$ atom in formula (II), with the $N^1$ atoms being identified in formula (I'). In these embodiments, Q, Q', $R^4$, $R^{4'}$, n, m and p have the above stated definitions.

Some of the control agents are novel compounds. In some embodiments, the novel compounds may be characterized by the above formula (II). More specifically, novel compounds may be characterized by the formula:

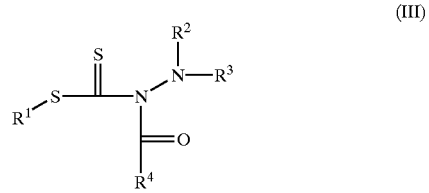

(III)

wherein $R^1$ is selected from the group consisting of hydrocarbyl, substituted hydrocarbyl, heteroatom-containing hydrocarbyl, and substituted heteroatom-containing hydrocarbyl, and combinations thereof, with the proviso that $R^1$ is not methyl;

$R^2$ and $R^3$ are each independently selected from the group consisting of hydrogen, hydrocarbyl, substituted hydrocarbyl, heteroatom-containing hydrocarbyl, and substituted heteroatom-containing hydrocarbyl, and combinations thereof; and $R^4$ is selected from the group consisting of hydrogen, hydrocarbyl, substituted hydrocarbyl, heteroatom-containing hydrocarbyl, and substituted heteroatom-containing hydrocarbyl, and combinations thereof; and optionally, $R^4$ combines with $R^2$ to form a ring structure, with said ring having from 3 to 50 non-hydrogen atoms. In more specific embodiments, $R^1$—$R^4$ are selected from the lists given above.

In some embodiments within formula (III), $R^2$ and/or $R^3$ may be independently selected from —Q(=Q')$_n$(R$^{4'}$—Q')$_m$(R$^4$)$_p$. In these embodiments, Q, Q', $R^4$, $R^{4'}$, n, m and p have the above stated definitions.

Also more specifically, the novel compounds may be characterized by the formula:

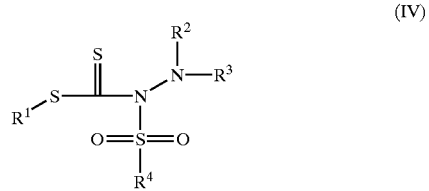

(IV)

wherein $R^1$ is selected from the group consisting of hydrocarbyl, substituted hydrocarbyl, heteroatom-containing hydrocarbyl, and substituted heteroatom-containing hydrocarbyl, and combinations thereof;

$R^2$ and $R^3$ are each independently selected from the group consisting of hydrogen, hydrocarbyl, substituted hydrocarbyl, heteroatom-containing hydrocarbyl, and substituted heteroatom-containing hydrocarbyl, and combinations thereof, and optionally, $R^2$ and $R^3$ are joined together in a ring structure having between 3 and 50 non-hydrogen atoms in said ring; and $R^4$ is selected from the group consisting of hydrogen, hydrocarbyl, substituted hydrocarbyl, heteroatom-containing hydrocarbyl, and substituted heteroatom-containing hydrocarbyl, and combinations thereof; and optionally, $R^4$ combines with $R^2$ to form a ring structure, with said ring having from 3 to 50 non-hydrogen atoms. In more specific embodiments, $R^1$—$R^4$ are selected from the lists given above.

In some embodiments within formula (IV), $R^2$ and/or $R^3$ may be independently selected from —Q(=Q')$_n$(R$^{4'}$—Q')$_m$(R$^4$)$_p$. In these embodiments, Q, Q', $R^4$, $R^{4'}$, n, m and p have the above stated definitions.

In more specific embodiments, the groups of the novel compounds can have $R^1$ is selected from the group consisting of optionally substituted alkyl, optionally substituted aryl, optionally substituted alkenyl, optionally substituted alkoxy, optionally substituted heterocyclyl, optionally substituted alkylthio, optionally substituted amino and optionally substituted polymer chains. Even more specifically, $R^1$ is selected from the group consisting of —$CH_2Ph$, —$CH(CH_3)CO_2CH_2CH_3$, —$CH(CO_2CH_2CH_3)_2$, —$C(CH_3)_2CN$, —$CH(Ph)CN$ and —$C(CH_3)_2Ph$. Also, $R^2$ and $R^3$ may be each independently selected from the group consisting of hydrogen, optionally substituted alkyl, optionally substituted aryl, optionally substituted alkenyl, optionally substituted acyl, optionally substituted, aroyl, optionally substituted alkoxy, optionally substituted heteroaryl, optionally substituted heterocyclyl, optionally substituted alkylsulfonyl, optionally substituted alkylsulfinyl, optionally substituted alkylphosphonyl, optionally substituted arylsulfinyl, and optionally substituted arylphosphonyl. Further, $R^4$ may be selected from the groups listed above.

Specific control agents within these formulas include:

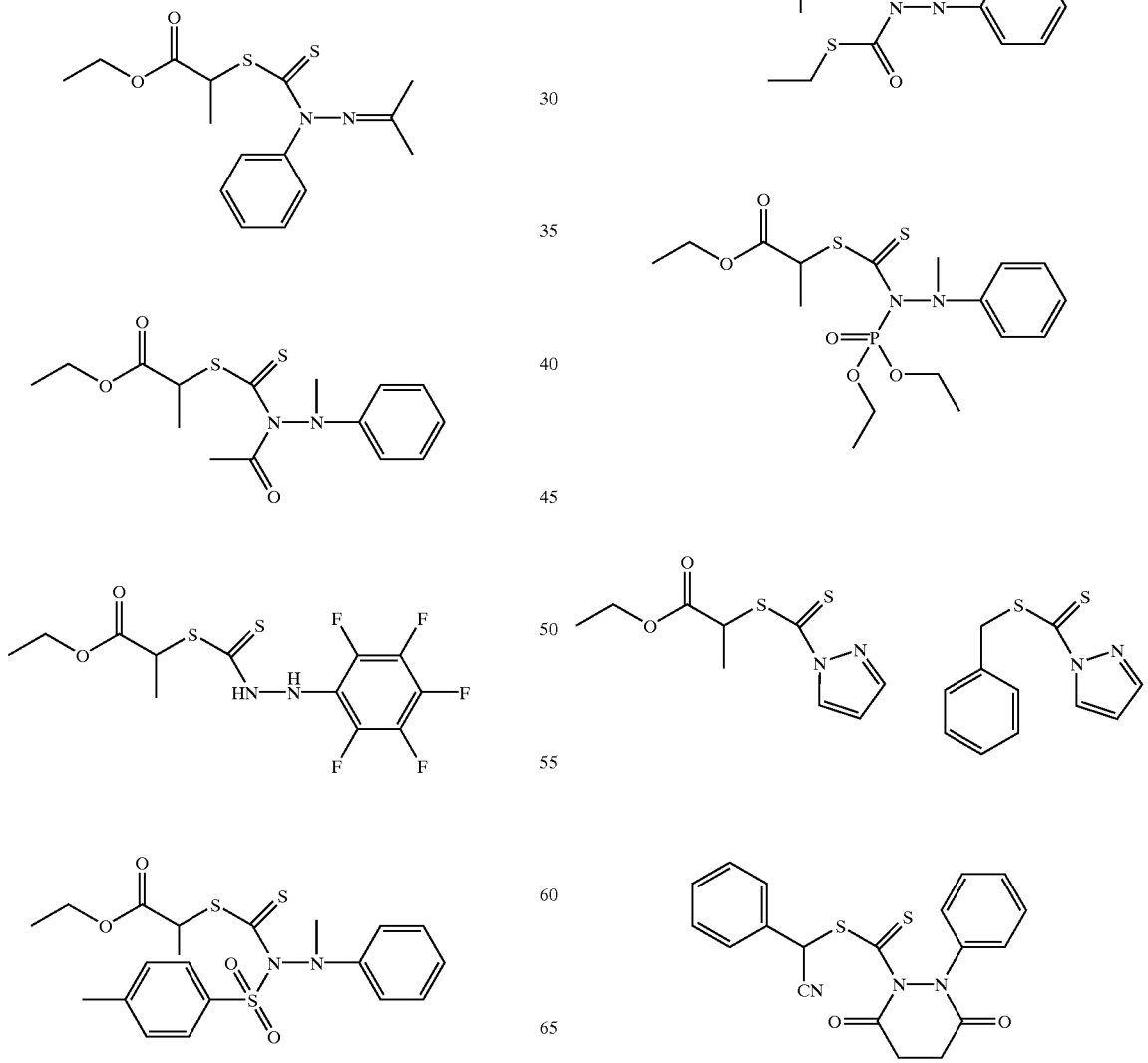

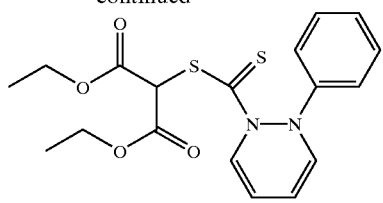

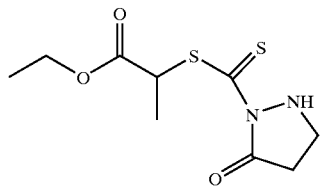

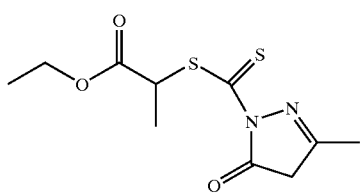

This invention also includes multi-functional control agents and their use in free radical polymerization. A multi-functional control agent is a molecule that allows for two or more polymer chains to polymerize from a single control agent molecule. In some embodiments, the control agents are attached to a core that has multiple functional sites for attachment of one portion of a control agent. Thus, in some embodiments, $R^2$, $R^3$ and/or $R^4$ forms part of or is attached to a core molecule. In other embodiments, $R^1$ is part of or attached to a core molecule. These multi-functional chain transfer agents may be characterized by any of the following general formulas:

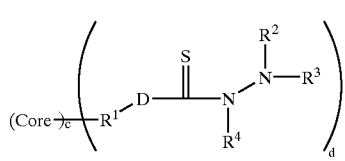

(V)

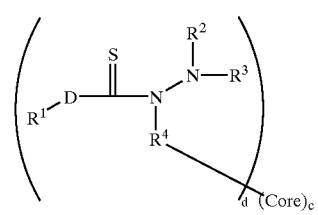

(VI)

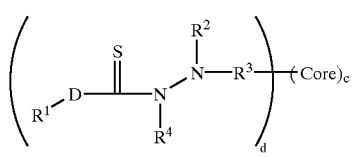

(VII)

wherein Core is a core molecule, and D, $R^1$, $R^2$, $R^3$ and $R^4$ are as defined above, c is 1 or more and d is 2 or more. Formulas (V), (VI) and (VII) include multiple core molecules, providing many possible points from which a free radical polymerization may be controlled. This provides the ability to make may different architectures for polymers, some of which are discussed below. For example, for a star architecture polymer c is 1 and d is 3 for a three arm star; c is 1 and d is 4 for a 4 arm star; c is 1 and d is 6 for a six arm star; etc. Also for example, for a grafted polymer, c is 1 and d is 2 for two grafts, etc. For a hyper-branched polymer, c is 2 or more and d is 2 or more.

The multifunctional chain transfer agents may also be drawn for the more specific embodiments of this invention, as follows:

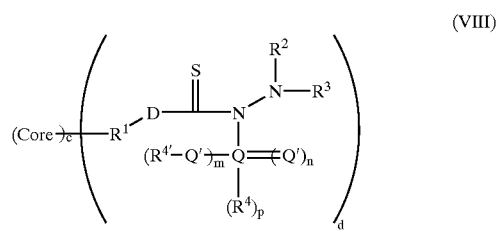

(VIII)

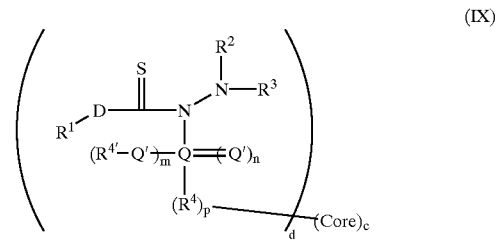

(IX)

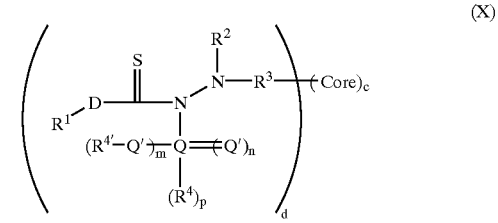

(X)

wherein Core, Q, Q', n, c, d, D, $R^1$, $R^2$, $R^3$ and $R^4$ are as defined above.

The Core molecule may be selected from the group consisting of dendritic molecules, small molecules and polymers with at least two terminus ends. Thus, Core molecule may be optionally substituted hydrocarbyl and optionally substituted heteroatom containing hydrocarbyl. Specific examples of Core molecules include:

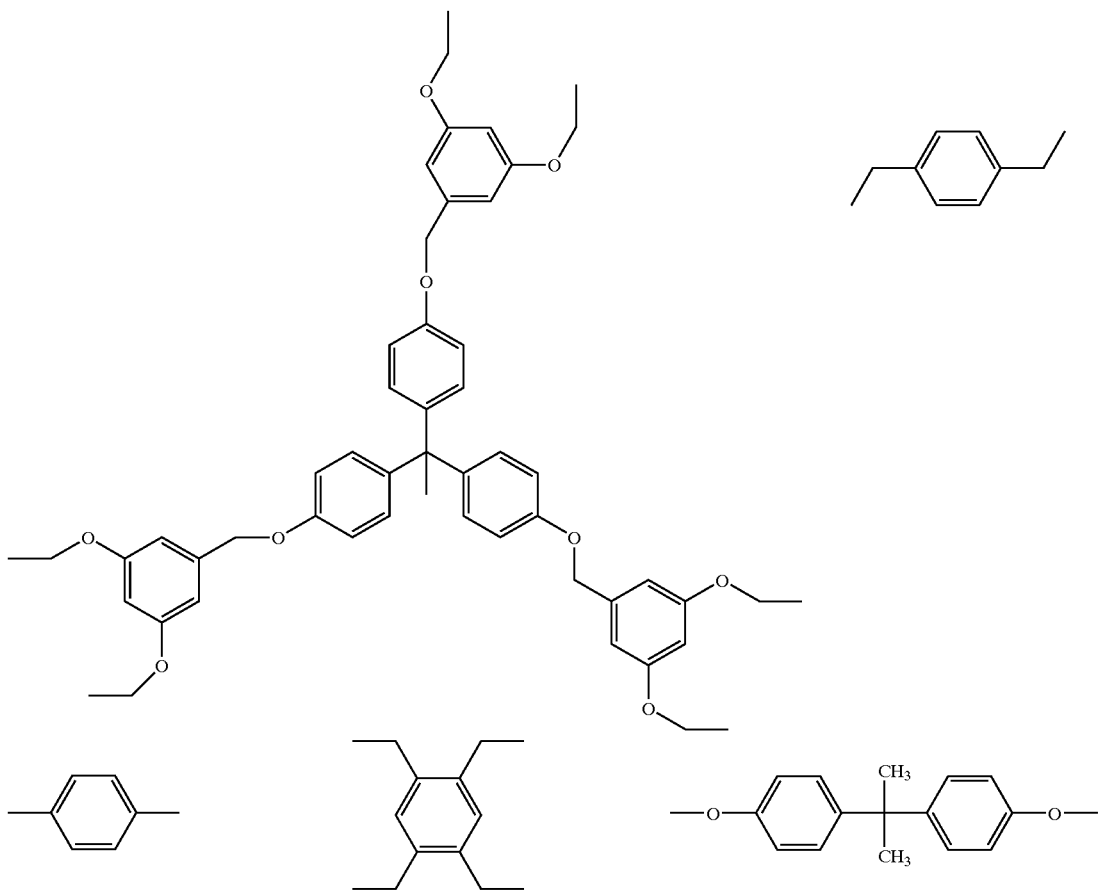

In other embodiments, the Core will be a polymer chain. These embodiments allow for the preparation of grafts or block copolymers by attaching control agents to two or more points along the polymer backbone or side chains or polymer termni.

In alternative embodiments, the control agents of this invention have a ring structure, which upon ring opening may form a multi-functional control agent. Thus, in some embodiments, formulas (I) and (II) above are arranged so that D is sulfur, $R^3$ is deleted, and the nitrogen atom from which $R^3$ was deleted forms a ring with $R^1$ providing general formulas:

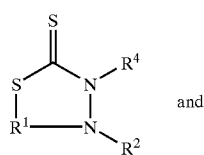

(XI)

and

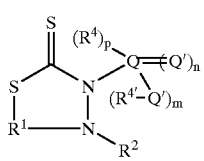

(XII)

wherein the above variables have the same definitions, with the exception that $R^1$ is a bifunctional moiety within the definitions given above. In a particularly preferred embodiment, $R^1$ comprises —CH($R^5$)—C(O)— such that formulas (XI) and (XII) can be redrawn as:

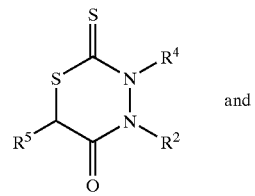

and (XIII)

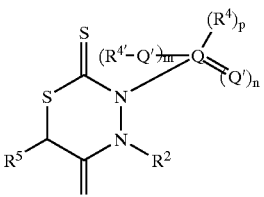

(XIV)

wherein $R^2$, $R^4$, Q, Q' and n are as defined above. $R^5$ is selected from the group consisting of hydrogen, hydrocarbyl, substituted hydrocarbyl, heteroatom-containing hydrocarbyl, and substituted heteroatom-containing hydrocarbyl, and combinations thereof. In particular, $R^5$ is selected from the group consisting of hydrogen, optionally substituted alkyl, optionally substituted aryl, optionally substituted alkenyl, optionally substituted acyl, optionally substituted, aroyl, and optionally substituted alkoxy. Preferred $R^5$ groups include hydrogen, methyl, ethyl, propyl, butyl, methoxy, ethoxy, propoxy, phenoxy and phenyl. As above, $R^4$ and $R^2$ can combine to form a ring structure having from 4 to 50 non-hydrogen atoms.

In some embodiments within formulas (XIII) and (XIV), $R^2$ may be independently selected from —Q(=Q')$_n$(R$^{4'}$—Q')$_m$(R$^4$)$_p$. In these embodiments, Q, Q', $R^4$, $R^{4'}$, n, m and p have the above stated definitions.

In other alternative embodiments, the multi-functional control agents of this invention can be characterized by any of the following formulas (which may fall within the general formulas given above):

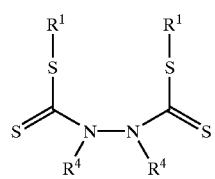

(XV)

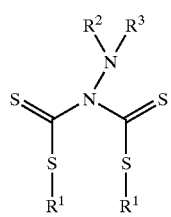

(XVII)

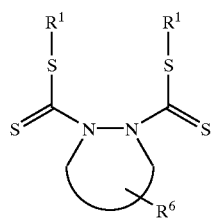

(XVI)

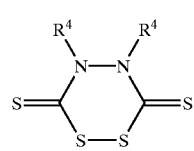

(XVIII)

wherein $R^1$, $R^2$, $R^3$ and $R^4$ are as defined above. In formula (XVI), the moiety

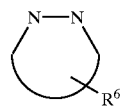

refers to a ring structure having between 3 and 20 non-hydrogen atoms in the ring, including single ring or multiple rings that are fused together, linked covalently, or linked to a common group such as a methylene or ethylene moiety. $R^6$ is a substituent on any member of the ring other than the two shown nitrogen atoms. There may be as many $R^6$ substituents as ring members in addition to the two nitrogen atoms. $R^6$ substituents may be selected from the group consisting of hydrocarbyl, substituted hydrocarbyl, heteroatom-containing hydrocarbyl, and substituted heteroatom-containing hydrocarbyl, and combinations thereof. In particular, $R^6$ is selected from the group consisting of optionally substituted alkyl, optionally substituted aryl, optionally substituted alkenyl, optionally substituted acyl, optionally substituted, aroyl, and optionally substituted alkoxy.

Specific cyclic/multi-functional control agents include:

Cyclic

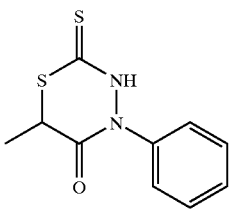 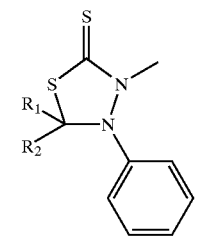

$R_1 = H$
$R_2 = CN, CO_2Et, Ph$

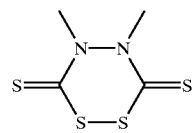

Multi-functional

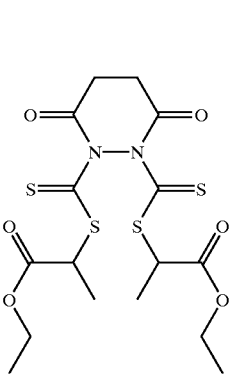

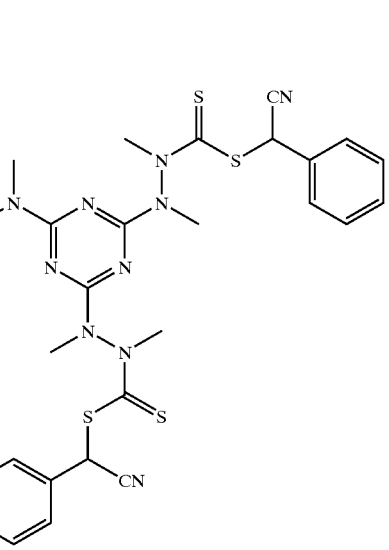

-continued

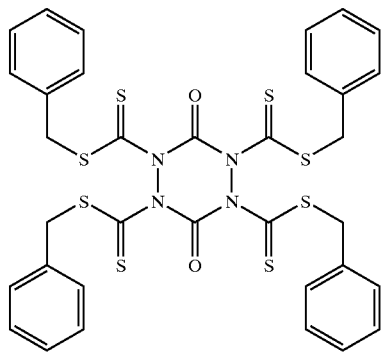

The control agents of this invention are synthesized, generally, by methods known to those of skill in the art. The general synthetic approach comprises the nitrogen. nucleophilic addition to carbon disulfide and alkylation of the resulted dithiocarbazate with alkylhalides in a one-pot methodology, as shown in the following scheme 2:

Scheme 2

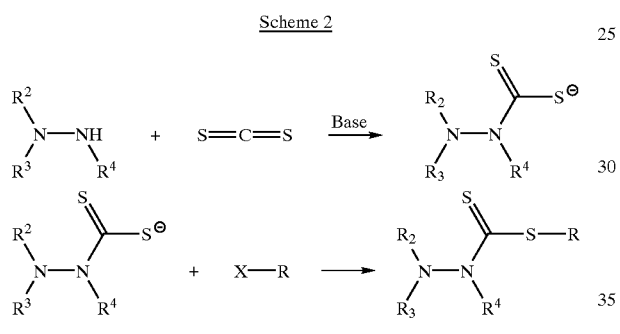

This method is similar to those published in scientific journals, e.g., Castro et al., *J Org. Chem.*, 1984, 49, 863, which is incorporated herein by reference.

The synthesis conditions optimized for these particular nucleophiles—hydrazines and their derivatives include: temperature in the range of 0° C. to ambient; solvents—alcohols, acetone, acetonitrile, dioxane, DMF, DMSO; base—sodium 10 hydroxide, potassium hydroxide, and sodium hydride. The preferred conditions include using sodium hydroxide as the base in DMSO at ambient temperature.

The general procedure comprises starting with the hydrazine or its derivative dissolved in DMSO in approximately a 0.5–1.0 M concentration at ambient temperature. The solution is then treated with approximately 1 equivalent of NaOH and followed by addition of approximately 1 equivalent of carbon disulfide. The resulting solution is then stirred (for example, for approximately 1 hour at ambient temperature) before addition of approximately 1 equivalent of an alkylation agent. Work-up may comprise addition of water, extraction with organic solvent, and drying. The desired control agent may be purified by chromatography and/or recrystallization and may be characterized by $^1$H NMR, $^{13}$C NMR, and GC/MS.

Most of hydrazines and their derivatives are available commercially from known chemical sources. However, to increasing the diversity of the control agents, several transformations may be applied, including:

1. hydrazone formation as shown in scheme 3:

Scheme 3

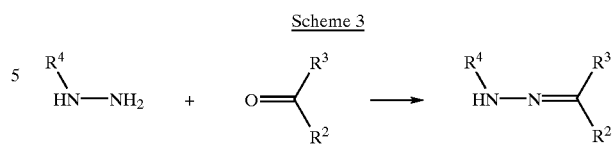

2. hydrazide formation as shown in scheme 4:

Scheme 4

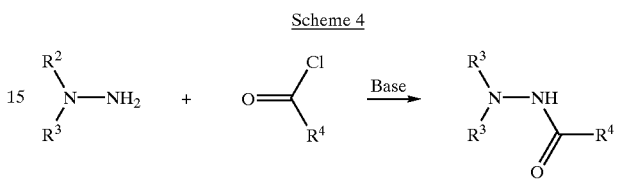

3. sulfonylhydrazine formation as shown in scheme 5:

Scheme 5

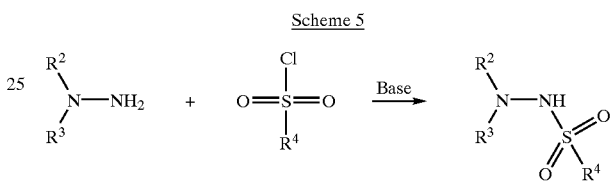

4. phosphoryl hydrazine formation as shown in scheme 6:

Scheme 6

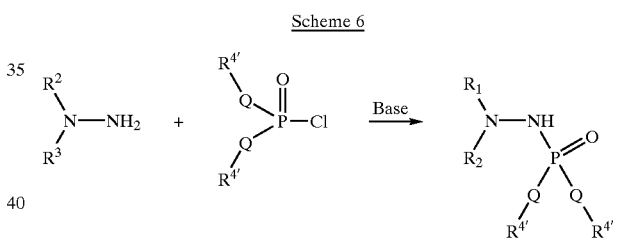

5. Urea and urethane derivatives formation as shown in scheme 7:

Scheme 7

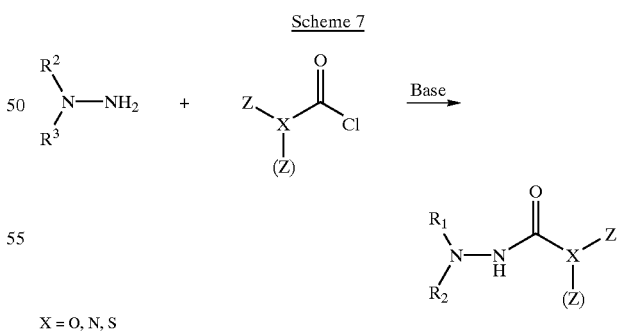

X = O, N, S

In scheme 7, Z is used to denote the variables shown in formula (II), above.

6. Cyclic hydrazine derivatives formation as shown in scheme 8:

Scheme 8

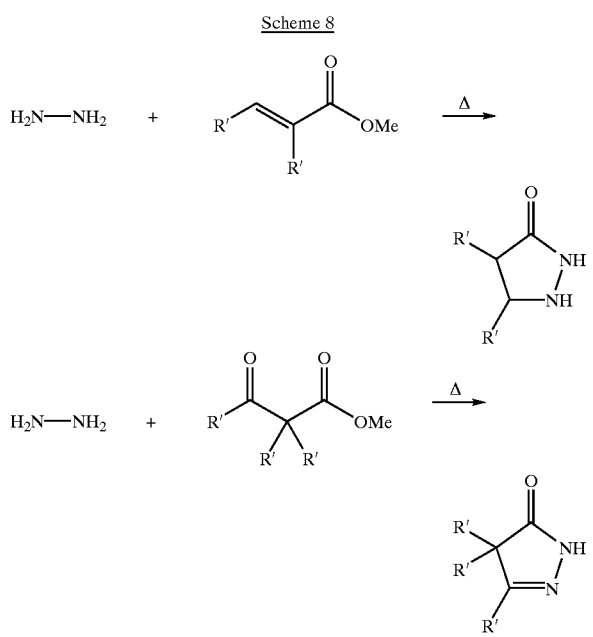

In scheme 8, R' is used to represent the various R groups discussed herein (e.g., $R^2$, $R^3$ and/or $R^4$).

The cyclic control agents for example as shown below may be prepared from an appropriate alkylation agent which can subsequently react with another nitrogen of the hydrazine, as shown below in scheme 9:

Scheme 9

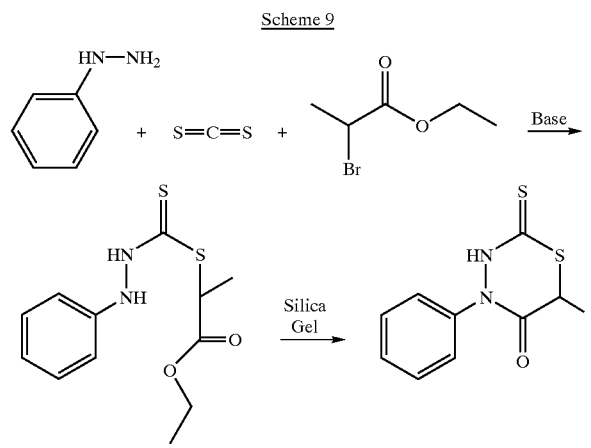

Those of skill in the art will appreciate that scheme 9 can be modified to obtain desired substituents, as shown in generally in formulas (XIII) and (XIV), above.

Polymerization Processes

The polymerization conditions that may be used include temperatures for polymerization typically in the range of from about 20° C. to about 110° C., more preferably in the range of from about 50° C. to about 90° C. and even more preferably in the range of from about 60° C. to about 80° C. The atmosphere may be controlled, with an inert atmosphere being preferred, such as nitrogen or argon. The molecular weight of the polymer is controlled via adjusting the ratio of monomer to control agent. Generally, the molar ratio of monomer to control agent is in the range of from about 5 to about 5000, more preferably in the range of from about 10 to about 2000, and most preferably from 10 to about 1500.

A free radical source is provided in the polymerization mixture, which can stem from spontaneous free radical generation upon heating or preferably from a free radical initiator. In the latter case the initiator is added to the polymerization mixture at a concentration high enough to for an acceptable polymerization rate (e.g., commercially significant conversion in a certain period of time, such as listed below). Conversely, a too high free radical initiator to control agent ratio will favor unwanted dead polymer formation through radical-radical coupling reaction leading to polymer materials with uncontrolled characteristics. The molar ratio of free radical initiator to control agent for polymerization are typically in the range of from about 2:1 to about 0.02:1.

Polymerization conditions also include the time for reaction, which may be from about 0.5 hours to about 72 hours, preferably in the range of from about 1 hour to about 24 hours, more preferably in the range of from about 2 hours to about 12 hours. Conversion of monomer to polymer is preferably at least about 50%, more preferably at least about 75% and most preferable at least about 85%.

The polymerization process generally proceeds in a "living" type manner. Thus, generally an approximately linear relationship between conversion and number average molecular weight can be observed, although this is not a pre-requisite. The living character manifests itself by the ability to prepare block copolymers: hence, a polymer chain is first grown with monomer A, and then, when monomer A is depleted, monomer B is added to extend the first block of polymer A with a second block of polymer B. Thus, in some instances, particularly when the chain transfer constant of the control agent, Ct, is low (Ct being defined as the ratio of the transfer rate coefficient to the propagation rate constant), e.g., Ct less than 2, the molecular weight to conversion plot might not exhibit a linear trend: this does not preclude however that block copolymer formation did not occur. Block copolymer formation through a living process can be demonstrated using analytical techniques such as polymer fractionation with selective solvent (of polymer A, polymer B, respectively), gradient elution chromatography and/or 2-dimensional chromatography. Block copolymers tend to microphase-separate and organize in a variety of morphologies that can be probed by physical techniques such as X-ray diffraction, dynamic mechanical testing, and the like.

Initiators, as discussed above, may be optional. When present, initiators useful in the polymerization mixture and the inventive process are known in the art, and may be selected from the group consisting of alkyl peroxides, substituted alkyl peroxides, aryl peroxides, substituted aryl peroxides, acyl peroxides, alkyl hydroperoxides, substituted alkyl hydroperoxides, aryl hydroperoxides, substituted aryl hydroperoxides, heteroalkyl peroxides, substituted heteroalkyl peroxides, heteroalkyl hydroperoxides, substituted heteroalkyl hydroperoxides, heteroaryl peroxides, substituted heteroaryl peroxides, heteroaryl hydroperoxides, substituted heteroaryl hydroperoxides, alkyl peresters, substituted alkyl peresters, aryl peresters, substituted aryl peresters, and azo compounds. Specific initiators include benzoylperoxide (BPO) and AIBN. The polymerization mixture may use a reaction media is typically either an organic solvent or bulk monomer or neat. Optionally, after the polymerization is over (e.g., completed or terminated) the thio-moiety (e.g., a dithio-moiety) of the control agent can be cleaved by chemical or thermal ways, if one wants to reduce the sulfur content of the polymer and prevent any problems associated with presence of the control agents chain ends, such as odor or discoloration. Typical chemical treatment includes the catalytic or stoichiometric addition of base such as a primary amine, acid or anhydride, or oxidizing agents such as hypochlorite salts.

Generally, monomers that may be polymerized using the methods of this invention (and from which M, below, may be derived) include at least one monomer is selected from the group consisting of styrene, substituted styrene, alkyl acrylate, substituted alkyl acrylate, alkyl methacrylate, substituted alkyl methacrylate, acrylonitrile, methacrylonitrile, acrylamide, methacrylamide, N-alkylacrylamide, N-alkylmethacrylamide, N,N-dialkylacrylamide, N,N-dialkylmethacrylamide, isoprene, butadiene, ethylene, vinyl acetate and combinations thereof. Functionalized versions of these monomers may also be used. Specific monomers or comonomers that may be used in this invention include methyl methacrylate, ethyl methacrylate, propyl methacrylate (all isomers), butyl methacrylate (all isomers), 2-ethylhexyl methacrylate, isobomyl methacrylate, methacrylic acid, benzyl methacrylate, phenyl methacrylate, methacrylonitrile, a-methylstyrene, methyl acrylate, ethyl acrylate, propyl acrylate (all isomers), butyl acrylate (all isomers), 2-ethylhexyl acrylate, isobornyl acrylate, acrylic acid, benzyl acrylate, phenyl acrylate, acrylonitrile, styrene, glycidyl methacrylate, 2-hydroxyethyl methacrylate, hydroxypropyl methacrylate (all isomers), hydroxybutyl methacrylate (all isomers), N,N-dimethylaminoethyl methacrylate, N,N-diethylaminoethyl methacrylate, triethyleneglycol methacrylate, itaconic anhydride, itaconic acid, glycidyl acrylate, 2-hydroxyethyl acrylate, hydroxypropyl acrylate (all isomers), hydroxybutyl acrylate (all isomers), N,N-dimethylaminoethyl acrylate, N,N-diethylaminoethyl acrylate, triethyleneglycol acrylate, methacrylamide, N-methylacrylamide, N,N-dimethylacrylamide, N-tert-butylmethacrylamide, N-n-butylmethacrylamide, N-methylolmethacrylamide, N-ethylolmethacrylamide, N-tert-butylacrylamide, N-n-butylacrylamide, N-methylolacrylamide, N-ethylolacrylamide, 4-acryloylmorpholine, vinyl benzoic acid (all isomers), diethylaminostyrene (all isomers), a-methylvinyl benzoic acid (all isomers), diethylamino a-methylstyrene (all isomers), p-vinylbenzene sulfonic acid, p-vinylbenzene sulfonic sodium salt, trimethoxysilylpropyl methacrylate, triethoxysilylpropyl methacrylate, tributoxysilylpropyl methacrylate, dimethoxymethylsilylpropyl methacrylate, diethoxymethylsilylpropyl methacrylate, dibutoxymethylsilylpropyl methacrylate, diisopropoxymethylsilylpropyl methacrylate, dimethoxysilylpropyl methacrylate, diethoxysilylpropyl methacrylate, dibutoxysilylpropyl methacrylate, diisopropoxysilylpropyl methacrylate, trimethoxysilylpropyl acrylate, triethoxysilylpropyl acrylate, tributoxysilylpropyl acrylate, dimethoxymethylsilylpropyl acrylate, diethoxymethylsilylpropyl acrylate, dibutoxymethylsilylpropyl acrylate, diisopropoxymethylsilylpropyl acrylate, dimethoxysilylpropyl acrylate, diethoxysilylpropyl acrylate, dibutoxysilylpropyl acrylate, diisopropoxysilylpropyl acrylate, maleic anhydride, N-phenylmaleimide, N-butylmaleimide, butadiene, isoprene, chloroprene, ethylene, vinyl acetate and combinations thereof.

In some embodiments of the polymers of this invention, a combination of hydrophobic and hydrophilic monomers may be used, either randomly or in separate blocks of a copolymer (e.g., thermoplastic elastomers, grafts, etc). The hydrophobic/hydrophilic nature of monomers may be determined according to the log P of the particular monomers, which is sometimes referred to as the octanol-water partition coefficient. Log P values are well known and are determined according to a standard test that determines the concentration of monomer in a water/1-octanol separated mixture. In particular, computer programs are commercially available as well as on the internet that will estimate the log P values for particular monomers. Some of the log P values in this application were estimated from the web site http://esc.syrres.com/interkow/kowdemo.htm, which provides an estimated log P value for molecules by simply inserting the CAS registry number or a chemical notation. Log P values listed herein were obtained from either the web site listed above or from Hansch et al. *Exploring QSAR: Hydrophobic, Electronic, and Steric Constants* (ACS Professional Reference Book, 1995), which is incorporated herein by reference.

Suitable hydrophilic monomers (with approximate log P values listed in parentheses) may be listed above and include, but are not limited to, acrylic acid (0.35), methacrylic acid (0.93), N,N-dimethylacrylamide (−0.13), dimethyl aminoethyl methacrylate (0.97), quaternized dimethylaminoethyl methacrylate, methacrylamide (−0.26), N-t-butyl acrylamide (1.02), maleic acid (−0.48), maleic anhydride and its half esters, crotonic acid (0.72), itaconic acid (−0.34), acrylamide (−0.67), acrylate alcohols, hydroxyethyl methacrylate, diallyldimethyl ammonium chloride, vinyl ethers (such as methyl vinyl ether), maleimides, vinyl pyridine, vinyl imidazole (0.96), other polar vinyl heterocyclics, styrene sulfonate, allyl alcohol (0.17), vinyl alcohol (such as that produced by the hydrolysis of vinyl acetate after polymerization), salts of any acids and amines listed above, and mixtures thereof. Preferred hydrophilic monomers include acrylic acid, N,N-dimethyl acrylamide (−0.13), dimethylaminoethyl methacrylate (0.97), quaternized dimethyl aminoethyl methacrylate, vinyl pyrrolidone, salts of acids and amines listed above, and combinations thereof.

Suitable hydrophobic monomers may be listed above and include, but are not limited to, acrylic or methacrylic acid esters of $C_1$–$C_{18}$ alcohols, such as methanol, ethanol, methoxy ethanol, 1-propanol, 2-propanol, 1-butanol, 2-methyl-1-propanol, 1-pentanol, 2-pentanol, 3-pentanol, 2-methyl-1-butanol, 1-methyl-1-butanol, 3-methyl-1-butanol, 1-methyl-1-pentanol, 2-methyl-1-pentanol, 3-methyl-1-pentanol, t-butanol (2-methyl-2-propanol), cyclohexanol, neodecanol, 2-ethyl-1-butanol, 3-heptanol, benzyl alcohol, 2-octanol, 6-methyl-1-heptanol, 2-ethyl-1-hexanol, 3,5-dimethyl-1-hexanol, 3,5,5-tri methyl-1-hexanol, 1-decanol, 1-dodecanol, 1-hexadecanol, 1-octa decanol, and the like, the alcohols having from about 1 to about 18 carbon atoms, preferably from about 1 to about 12 carbon atoms; styrene; polystyrene macromer, vinyl acetate; vinyl chloride; vinylidene chloride; vinyl propionate; alpha-methylstyrene; t-butylstyrene; butadiene; cyclohexadiene; ethylene; propylene; vinyl toluene; and mixtures thereof. Preferred hydrophobic monomers (with approximate log P values listed in parentheses) include n-butyl methacrylate (2.36), isobutyl methacrylate (2.66), t-butyl acrylate (2.09), t-butyl methacrylate (2.54), 2-ethylhexyl methacrylate (4.09), methyl methacrylate (1.38), vinyl acetate (0.73), vinyl acetamide, vinyl formamide, and mixtures thereof, more preferably t-butyl acrylate, t-butyl methacrylate, or combinations thereof In addition, monomers that polymerize in a ring closing method may also be used in this invention, including monomers that are of the formula: $CH_2{=}CH{-}X'{-}CH{=}CH_2$ where X' comprises from 1 to 20 non-hydrogen atoms. Such monomers are well known in the art. A specific example is ${\{CH_2{=}CH{-}N(CH_3)_2{-}CH{=}CH_2\}}^+\{Cl\}^-$.

Polymers

The polymers formed with the chain transfer agents of this invention are believed to be grown via a degenerative transfer mechanism. Thus, upon analysis of the obtained polymers, monomers might appear between the $R^1$—S bond, and any of the above formulas can be rewritten in a polymeric form. For example, the polymers of this invention may be characterized by the general formula:

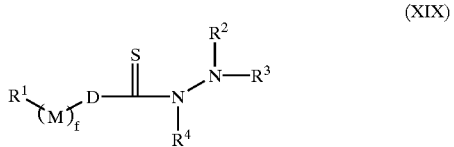

(XIX)

wherein M is a monomer or mixture of monomers or at least 2 blocks of different monomer (any from the above lists) and f is the degree of polymerization, and D, $R^1$, $R^2$, $R^3$ and $R^4$ are as defined above.

For the more specific embodiment, the polymer of this invention, the polymers may be characterized by the general formula:

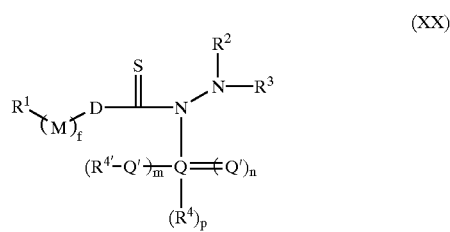

(XX)

wherein M is a monomer or mixture of monomers or at least 2 blocks of different monomer (any from the above lists) and f is the degree of polymerization, and Q, Q', n, D, $R^1$, $R^2$, $R^3$ and $R^4$ are as defined above.

Free radical polymerization of cyclic monomers by ring opening mechanism is known (see, e.g., The Chemistry Of Free Radical Polymerization, G. Moad, D. H. Solomon, Eds. (Pergamon Pub., 1995), p 176–183). However no commercially viable process has been developed so far. This is due at least in part to the poor reactivity of these monomer compounds (e.g., Ketene acetals) as well as their relative instability to water traces. Moreover, known polymerization mechanisms for ring opening polymerization systems are not know for their living-type kinetics.

Surprisingly it has been found that the cyclized forms of the multi-functional control agents (such as those described by formulas (XIII) and (XIV)) lead to ring opening reaction under polymerization conditions. The polymer thus formed may be characterized by the general formula:

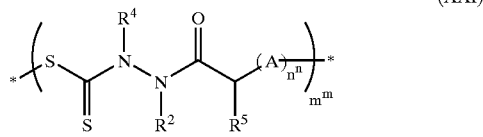

(XXI)

where $R^2$, $R^4$ and $R^5$ have the same definitions given above and A represents a repeat m" being the number of repeat units of the block with the attached control agent; and n" representing the ends of the polymer). The molecular weight of the polymer formed from monomer A is generally controlled by controlling the monomer to control agent ratio in the polymerization mixture, as discussed above.

As formula (XXI) shown, the multi-functional control agents of this invention also provide, in some embodiments, for a dithiocarbazate compound (i.e., N—NC(=S)S) in the backbone of a carbon-carbon polymer chain, such as usually obtained by free radical polymerization of ethylenic monomers. This is desirable for several applications: for instance, such polymers can be reduced to low molecular weight material by applying external stimuli such as UV, light, heat, biochemical or chemical treatment, which are known to cleave thiocarbonylthio linkage. Such polymers could be used as thermoplastics susceptible to degradation by exposure to sunlight, or by enzymatic digestion since it is known that short polymers chains are readily biodegradable.

Moreover, multiblock copolymers $(ABx)_y$ can be obtained in a two-step process, by first preparing a first multiblock homopolymer, denoted $(Ax)_y$, where x represents the dithiocarbazate N—NC(=S)S moiety and y represents the number of A or AB blocks and y is 2 or more, and then adding monomer B, in order to get $(ABx)_y$, which may be characterized by the general formula:

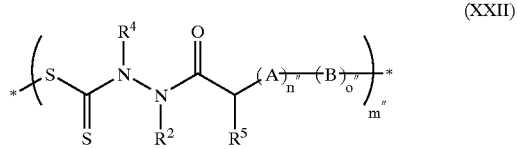

(XXII)

where $R^2$, $R^4$ and $R^5$ and n" and m" have the same definitions given above, A represents a repeat unit of block of monomer A and B represents a repeat unit of block of monomer B and o" is the degree of polymerization of monomer B. Monomers A and B can be selected from any of the above lists. Copolymers having a similar structure as $(AB)_y$ copolymers are usually prepared by multiple sequential addition of different monomers with the usual pitfalls such as loss of control as long as the number of block increase or contamination of block A with B monomers. This new process alleviates these difficulties.

The formulas for multifunctional control agents can also be written in polymer form, as follows:

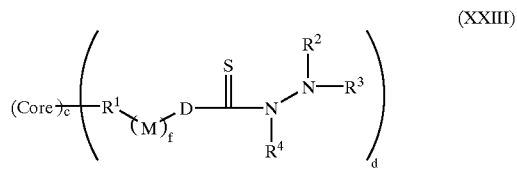

(XXIII)

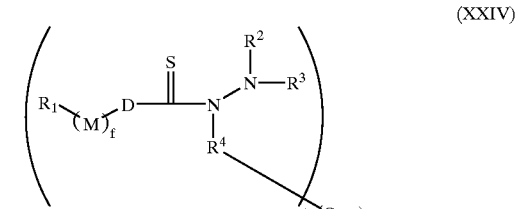

(XXIV)

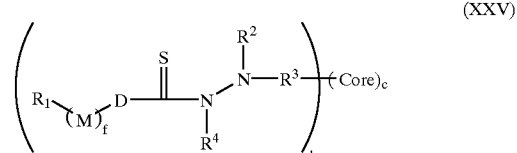

(XXV)

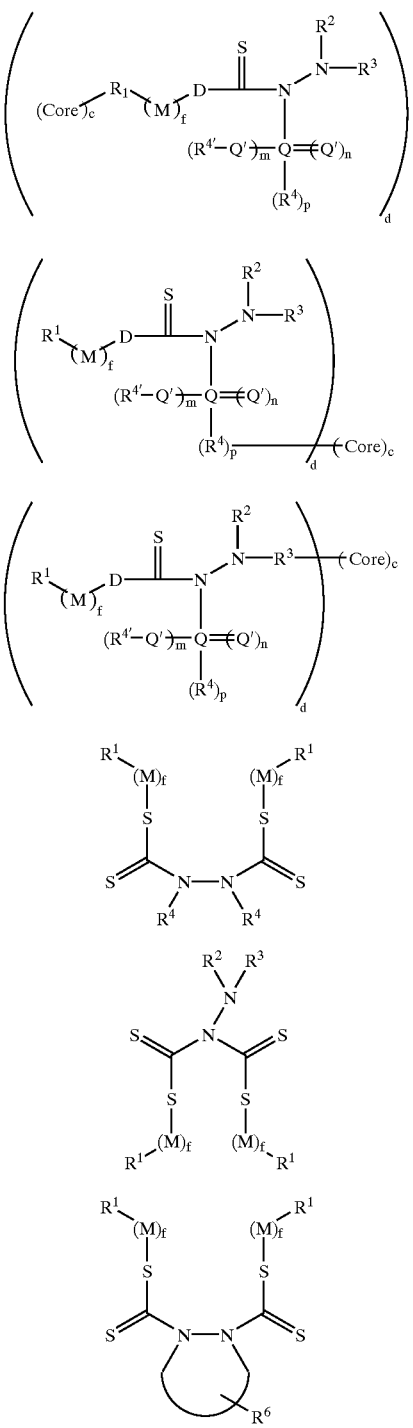

wherein each of the variable in formulas (XXIII) to (XXXI) have the above stated meanings.

In some embodiments of this invention, it is desirable to make a block copolymer, such as for example with both hydrophobic and hydrophilic monomers, with these monomers being selected from the above lists. In this case, the monomers M in the above formulas will be A and B or more blocks.

As used herein, "block copolymer" refers to a polymer comprising at least two segments of differing composition; having any one of a number of different architectures, where the monomers are not incorporated into the polymer architecture in a solely statistical or uncontrolled manner. Although there may be three, four or more monomers in a single block-type polymer architecture, it will still be referred to herein as a block copolymer. In some embodiments, the block copolymer will have an A-B architecture (with "A" and "B" representing the monomers). Other architectures included within the definition of block copolymer include A-B-A, A-B-A-B, A-B-C, A-B-C-A, A-B-C-A-B, A-B-C-B, A-B-A-C (with "C" representing a third monomer), and other combinations that will be obvious to those of skill in the art. Block copolymers can be prepared a number of ways, including sequential addition of monomers or using multi-functional control agents described above. Of course with multi-functional control agents, the control agent may form a linking group between one or more blocks of the copolymers.

In another embodiment, the block copolymers of this invention include one or more blocks of random copolymer together with one or more blocks of single monomers. Thus, a polymer architecture of A-R, A-R-B, A-B-R, A-R-B-R-C, etc. is included herein, where R is a random block of monomers A and B or of monomers B and C. Moreover, the random block can vary in composition or size with respect to the overall block copolymer. In some embodiments, for example, the random block R will account for between 5 and 80% by weight of the mass of the block copolymer. In other embodiments, the random block R will account for more or less of the mass of the block copolymer, depending on the application. Furthermore, the random block may have a compositional gradient of one monomer to the other (e.g., A:B) that varies across the random block in an algorithmic fashion, with such algorithm being either linear having a desired slope, exponential having a desired exponent (such as a number from 0.1–5) or logarithmic. The random block may be subject to the same kinetic effects, such as composition drift, that would be present in any other radical copolymerization and its composition, and size may be affected by such kinetics, such as Markov kinetics. Any of the monomers listed elsewhere in this specification may be used in the block copolymers of this invention.

A "block" within the scope of the block copolymers of this invention typically comprises about 10 or more monomers of a single type (with the random blocks being defined by composition and/or weight percent, as described above). In preferred embodiments, the number of monomers within a single block is about 15 or more, about 20 or more or about 50 or more. However, in an alternative embodiment, the block copolymers of this invention include blocks where a block is defined as two or more monomers that are not represented elsewhere in the copolymer. This definition is intended to encompass adding small amounts of a second monomer at one or both ends of a substantially homopolymeric polymer. In this alternative embodiment, the same copolymer architectures discussed above apply. This definition is therefore intended to include telechelic polymers, which include one or more functional end groups capable of reacting with other molecules. Thus, generally, a telechelic polymer is a block copolymer with in the definitions of this invention. The functional groups present at one or both ends of a telechelic polymer may be those known to those of skill in the art, including, for example, hydroxide, aldehyde, carboxylic acid or carboxylate, halogen, amine and the like, which have the ability to associate or form bonds with another molecule. Likewise, the block copolymers of the invention are intended to encompass telechelic polymers containing bifunctional groups, such as allyl-terminated or vinyl-terminated telechelics, sometimes referred to as macromonomers or macromers because of their ability to participate in polymerization reactions through the terminal functional group.

Combining the above embodiments provides a particularly powerful method of designing block copolymers. For example, a block copolymer may have the architecture F-A-B-F, where F represents functional groups that may be the same or different within a single F-A-B-F structure (which, therefore, may encompass F-A-B-F'). Other block copolymer architectures within the scope of this invention include A-R-B-F and F-A-R-B-F. Other architectures will be apparent to those of skill in the art upon review of this specification—indeed, without wishing to be bound by any particular theory—it is the living nature of the emulsions of this invention that provide the ability to even make these novel block copolymers.

In one embodiment, block copolymers are assembled by the sequential addition of different monomers or monomer mixtures to living polymerization reactions. In another embodiment, the addition of a pre-assembled functionalized block (such as a telechelic oligomer or polymer) to a living free radical is polymerization mixture yields a block copolymer. Ideally, the growth of each block occurs to high conversion. Conversions are determined by size exclusion chromatography (SEC) via integration of polymer to monomer peak. For UV detection, the polymer response factor must be determined for each polymer/monomer polymerization mixture. Typical conversions can be 50% to 100% for each block. Intermediate conversion can lead to block copolymers with a random copolymer block separating the two or more homopolymer blocks, depending on the relative rates of polymerization and monomer addition. At high conversion, the size of this random block is sufficiently small such that it is less to affect polymer properties such as phase separation, thermal behavior and mechanical modulus. This fact can be intentionally exploited to improve polymerization times for many applications without measurably affecting the performance characteristics of the resulting polymer. This is achieved by intentionally "killing" or terminating the living nature of the polymerization when a desired level of conversion (e.g., >80%) is reached by neutralizing the control agent, for example by introducing acids, bases, oxidizing agents, reducing agents, radical sources, scavengers, etc. In the absence of control agent, the polymerization continues uncontrolled (typically at much higher reaction rates) until the remaining monomer is consumed. Block copolymer can also be created by grafting monomers, monomer mixtures, oligomers or polymers only polymers having multiple available functional groups.

In other embodiments, block copolymers can be prepared by grafting processes, preparation of telechelic polymers, preparation of macromonomers, etc. In these embodiments, at least one polymer segment is derived from a living or controlled process of the invention, while other segments can be derived from any polymerization process, including, for example, controlled or uncontrolled radical polymerization, condensation polymerization, Ziegler-Natta and related processes, Ring-Opening Metathesis Polymerization, ionic polymerization, surface modification or grafting, or other addition or step-growth processes.

Block copolymers allow the combination of potentially diverse polymer properties (such as hard/soft and/or hydrophilic/hydrophobic (amphiphilic) blocks) into a single polymer chain. Hard/soft block copolymers combine segments with significantly different glass transition temperatures $T_g$. A typical hard/soft copolymer pairs a relatively "hard" block (e.g., styrene) with a relatively "soft" block (e.g., butyl acrylate). The resulting materials can possess performance attributes not found in any of the constituent segments. The presence of microphase separation and various phase morphologies in block copolymers is associated with unique performance attributes of many block copolymers. For example, by combining the stiffness or rigidity characteristic of hard materials with the compliance of soft materials, block copolymers may exhibit advantageous properties, such as processability under melt conditions, elasticity, resistance to abrasion and cracking and desired creep characteristics (corresponding to the material's ability to hold its shape under external stresses) depending on morphology, making them appropriate for use as extrudable bulk materials, coatings and separation media. The exact properties of a hard/soft copolymer depend significantly on the difference between the glass transition temperatures of the constituent blocks; accordingly, selection of monomers having glass transition temperatures a particular distance apart can lead to hard/soft block copolymers having particular desired characteristics. Thus, while for one application it may be appropriate to combine blocks having glass transition temperatures that differ by, for example, 20° C., the choice of $T_g$ (and therefore of materials) depends on the application.

Likewise, the amphiphilic block copolymers produced according to the invention display combinations of hydrophobic and hydrophilic properties that make such materials appropriate for use as surfactants or dispersants, scavengers, surface treatments and the like. Different block sizes over all ratios of monomers and molecular weights lead to families of novel compounds, for example thermoplastics, elastomers, adhesives, and polymeric micelles.

Multi-arm or star polymers can be generated using initiators capable of initiating multiple free radical polymerizations under the controlled conditions of the invention. Such initiators include, for example polyfunctional chain transfer agents, discussed above. Following initiation, the growth of each arm is controlled by the same living kinetics described for linear polymers, making it possible to assemble star polymers whose arms include individual homopolymers as well as di, tri or higher order block copolymers. Alternatively, multi-arm polymers are formed by growing end-functionalized oligomers or polymers followed by the addition of a cross-linking monomer such as ethylene glycol diacrylate, divinyl benzene, methylene bisacrylamide, trimetylol propane triacrylate, etc. The small hydrodynamic volume of star polymers produced according to these methods provides properties such as low viscosity, high $M_W$, and high functionality useful in applications such as rheology control, thermosets, and separation media. Similarly, the inclusion of branched or multiple ethylenically unsaturated monomers enables the preparation of graft polymers, again exhibiting the living kinetics characteristic of this invention. The existence of a block copolymer according to this invention is determined by methods known to those of skill in the art, including nuclear magnetic resonance (NMR), measured increase of molecular weight upon addition of a second monomer to chain-extend a living polymerization of a first monomer, microphase separation (e.g., long range order, microscopy and/or birefringence measurements), mechanical property measurements, (e.g., elasticity of hard/soft block copolymers), thermal analysis and chromatography (e.g., absence of homopolymer).

EXAMPLES

General: Syntheses of control agents were carried out under a nitrogen or argon atmosphere. Other chemicals were purchased from commercial sources and used as received, except for monomers, which were filtered through a short column of basic aluminum oxide to remove any inhibitor and degassed by applying vacuum. All polymerization mixtures were prepared in a glove box under a nitrogen or argon atmosphere and sealed, and polymerization was conducted at 60° C. or 70° C. Size Exclusion Chromatography was performed using an automated rapid GPC system for the primary screening (see WO 99/51980, incorporated herein by reference) and using automated conventional GPC system for secondary screening. In the current setup N,N-dimethylformamide containing 0.1% of trifluoroacetic acid was used as an eluent for the rapid GPC system whereas THF for the conventional system and polystyrene-based columns. All of the molecular weight results obtained are relative to linear polystyrene standards. NMR was carried out using a Bruker spectrometer (300 MHz) with $CDCl_3$ (chloroform-d) as solvent.

Example 1

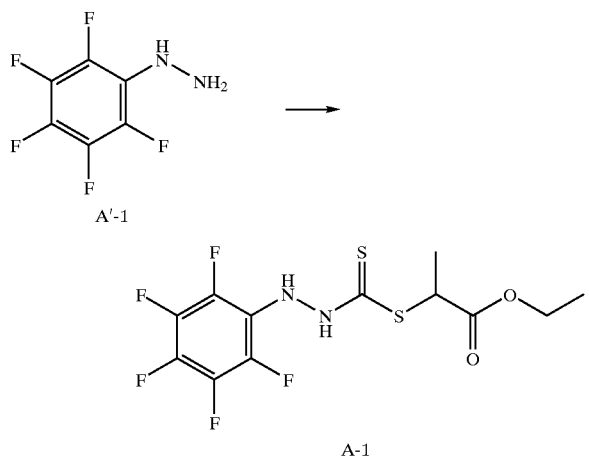

A 50 mL round-bottomed flask equipped with a magnetic stir bar and maintained under a nitrogen atmosphere was charged with hydrazine A'-1 (4.0 g, 20 mmol), sodium hydroxide (0.8 g, 20 mmol), and ethanol (20 mL). The reaction mixture was kept cold in an ice/water bath. To the resulting solution, carbon disulfide (1.21 mL, 20 mmol) was added dropwise. The mixture was stirred for an additional one hour after the addition was finished. Ethyl 2-bromopropionate (2.6 mL, 20 mmol) was then added to the reaction mixture at 0° C. After the reaction was completed, as monitored by thin layer chromatography (TLC), the reaction mixture was poured into 80 mL of water and followed by extraction with ethyl acetate (2×80 mL). The organic layer was further washed with water (2×80 mL) and dried over $MgSO_4$. The solvent was removed under reduced pressure and the product was further purified by flash chromatograph. The desired control agent A-1 was obtained in 72% yield (5.4 g).

Example 2

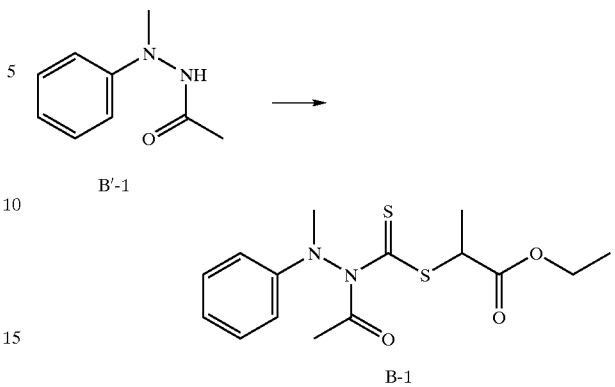

A 50 mL round-bottomed flask equipped with a magnetic stir bar and maintained under a nitrogen atmosphere was charged with hydrazine B'-1 (1.6 g, 10 mmol), sodium hydroxide (0.4 g, 10 mmol), and DMSO (20 mL). The reaction mixture was kept cold in an ice/water bath. To the resulting solution, carbon disulfide (0.6 mL, 10 mmol) was added dropwise. The mixture was stirred for an additional one hour after the addition was finished. Ethyl 2-bromopropionate (1.81 g, 1.3 mL) was then added to the reaction mixture at 0° C. After the reaction was completed, as monitored by TLC, the reaction mixture was poured into 80 mL of water and followed by extraction with ethyl ether (2×80 mL). The organic layer was further washed with water (2×80 mL) and dried over $MgSO_4$. The solvent was removed under reduced pressure and the product was further purified by flash chromatograph. The desired control agent B-1 was obtained in 67% yield (1.6 g).

Example 3

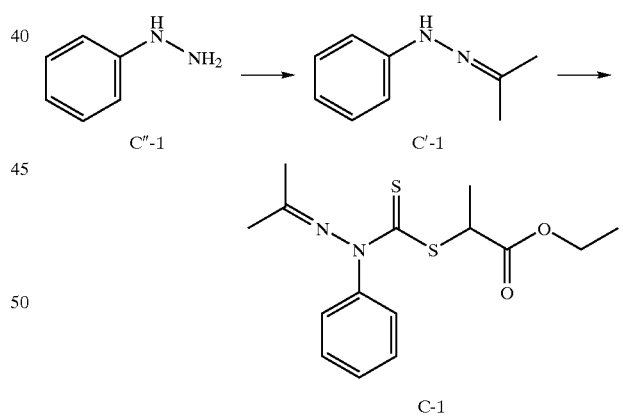

A 100 mL round-bottomed flask was charged with hydrazine C"-1 (3 mL, 30 mmol), and acetone (20 mL) at ambient temperature. The excess of acetone was removed under reduced pressure to give a quantitative yield of hydrazone C'-1. The flask then equipped with a magnetic stir bar and maintained under a nitrogen atmosphere was charged with sodium hydroxide (1.2 g, 30 mmol), and dimethylsulfoxide (DMSO) (60 mL) at ambient temperature. The reaction mixture was kept in a water bath. To the resulting solution, carbon disulfide (1.8 mL, 30 mmol) was added dropwise. The mixture was stirred for an additional one hour after the addition was finished. Ethyl 2-bromopropionate (3.9 mL, 30 mmol) was then added to the reaction mixture dropwise. After the reaction was completed, as monitored by TLC, the reaction mixture was poured into 120 mL of water and followed by extraction with ethyl acetate (2×80 mL). The organic layer was further washed with water (2×80 mL) and dried over MgSO$_4$. The solvent was removed under reduced pressure and the product was further purified by flash chromatograph. The desired control agent C-1 was obtained in 65% yield (6.3 g).

Example 4

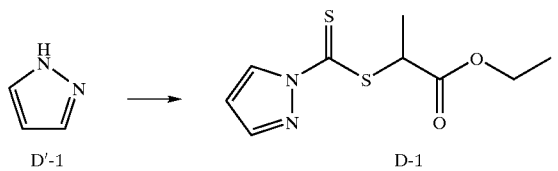

A 100 mL round-bottomed flask equipped with a magnetic stir bar and maintained under a nitrogen atmosphere was charged with pyrazole D'-1 (1.36 g, 20 mmol), sodium hydroxide (0.8 g, 20 mmol), and DMSO (40 mL). The reaction mixture was kept in an ice/water bath. To the resulting solution, carbon disulfide (1.2 mL, 20 mmol) was added dropwise. The mixture was stirred for an additional one hour after the addition was finished. Ethyl 2-bromopropionate (2.6 mL, 20 mmol) was then added to the reaction mixture dropwise. After the reaction was completed, as monitored by TLC, the reaction mixture was poured into 80 mL of water and followed by extraction with ethyl acetate (2×80 mL). The organic layer was further washed with water (2×80 mL) and dried over MgSO$_4$. The solvent was removed under reduced pressure and the product was further purified by flash chromatograph. The desired control agent D-1 was obtained in 85% yield (4.15 g).

Example 5

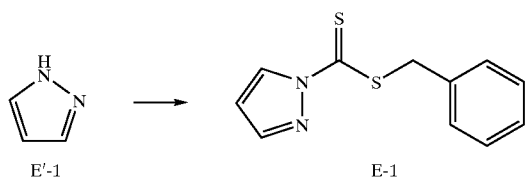

A 100 mL round-bottomed flask equipped with a magnetic stir bar and maintained under a nitrogen atmosphere was charged with pyrazole E'-1 (1.36 g, 20 mmol), sodium hydroxide (0.8 g, 20 mmol), and DMSO (40 mL). The reaction mixture was kept in an ice/water bath. To the resulting solution, carbon disulfide (1.2 mL, 20 mmol) was added dropwise. The mixture was stirred for an additional one hour after the addition was finished. Benzyl bromide (2.38 mL, 20 mmol) was then added to the reaction mixture dropwise. After the reaction was completed, monitored by TLC, the reaction mixture was poured into 80 mL of water and followed by extraction with ethyl acetate (2×80 mL). The organic layer was further washed with water (2×80 mL) and dried over MgSO$_4$. The solvent was removed under reduced pressure and the product was further purified by flash chromatograph. The desired control agent E-1 was obtained in 91% yield (4.3 g).

Example 6

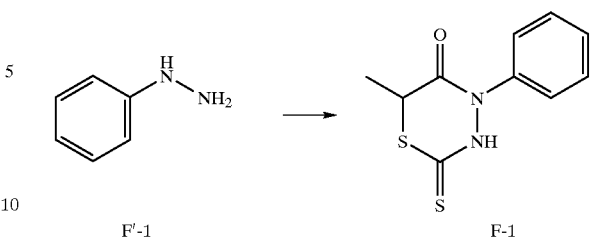

A 100 mL round-bottomed flask equipped with a magnetic stir bar and maintained under a nitrogen atmosphere was charged with hydrazine F'-1 (6 mL, 30 mmol), sodium hydroxide (1.2 g, 30 mmol), and DMSO (60 mL). The reaction mixture was kept in an ice/water bath. To the resulting solution, carbon disulfide (1.8 mL, 30 mmol) was added dropwise. The mixture was stirred for an additional one hour after the addition was finished. Ethyl 2-bromopropionate (3.9 mL, 30 mmol) was then added to the reaction mixture dropwise. After the reaction was completed, as monitored by TLC, the reaction mixture was poured into 120 mL of water and followed by extraction with ethyl acetate (2×80 mL). The organic layer was further washed with water (2×80 mL) and dried over MgSO$_4$. The solvent was removed under reduced pressure. The crude material was purified by silica gel column chromatography. The desired control agent F-1 was obtained in 55% yield (3.93 g).

Examples 7–15

These examples demonstrate polymerization of various monomers using control agents of this invention, specifically control agents A-1, B-1, C-2 and F-1, whose synthesis is described above. Each of the polymerizations was carried out in the same general way, which is that a 0.6M stock solution of each control agent in THF was first prepared. For each polymerization a single monomer was used in the amount of 3 mmol. 2,2'-azobis(2-methylpropionitrile) (AIBN) was the initiator used in each polymerization in a quantity of 10 mole % relative to the control agent. The control agent in each polymerization was 0.5 mole % relative to the amount of monomer. The polymerization mixture of each reaction was created by automated dispensing of reaction components at room temperature into a glass vial, which was then sealed. Each polymerization reaction was carried out at 60° C. for a time of 1 hour, 4 hours, 12 hours and 16 hours; thus, for each example, the polymerization was carried out four times, once for each time period. The monomers used were styrene (Sty), vinyl acetate (VA), and methyl acrylate (MA), each of which was used in neat form and prepared as discussed at the beginning of the example section. The results of these polymerizations are reported in Table 1, below.

A series of control experiments was also carried out, where the same polymerization mixtures were created, but no control agent was added. The results of those control experiments are not reported in detail because gels or very high molecular weight polymers were obtained.

TABLE 1

| Example | Control Agent | Monomer | Reaction Time (hrs) | $M_n$ | $M_w/M_n$ |
|---|---|---|---|---|---|
| 7 | A-1 | Sty | 1 | 38900 | 1.57 |
|   |   |   | 4 | 35700 | 1.54 |
|   |   |   | 12 | 36600 | 1.57 |
|   |   |   | 16 | 33700 | 1.61 |
| 8 | A-1 | VA | 1 | N/A | N/A |
|   |   |   | 4 | 9500 | 1.14 |
|   |   |   | 12 | 9300 | 1.14 |
|   |   |   | 16 | 10200 | 1.14 |
| 9 | A-1 | MA | 1 | 65000 | 1.37 |
|   |   |   | 4 | 71300 | 1.32 |
|   |   |   | 12 | 73000 | 1.32 |
|   |   |   | 16 | 64700 | 1.37 |
| 10 | B-1 | Sty | 1 | N/A | N/A |
|   |   |   | 4 | 5300 | 1.09 |
|   |   |   | 12 | 5600 | 1.09 |
|   |   |   | 16 | 6500 | 1.12 |
| 11 | B-1 | MA | 1 | N/A | N/A |
|   |   |   | 4 | N/A | N/A |
|   |   |   | 12 | 8300 | 1.16 |
|   |   |   | 16 | 12000 | 1.17 |
| 12 | C-1 | Sty | 1 | 97300 | 1.12 |
|   |   |   | 4 | 55600 | 1.47 |
|   |   |   | 12 | 58300 | 1.5 |
|   |   |   | 16 | 51500 | 1.58 |
| 13 | C-1 | MA | 1 | 39800 | 1.31 |
|   |   |   | 4 | 47700 | 1.32 |
|   |   |   | 12 | 39900 | 1.36 |
|   |   |   | 16 | 44400 | 1.34 |
| 14 | F-1 | Sty | 1 | N/A | N/A |
|   |   |   | 4 | 68500 | 1.35 |
|   |   |   | 12 | 70700 | 1.38 |
|   |   |   | 16 | 54600 | 1.51 |
| 15 | F-1 | MA | 1 | 273800 | 1.26 |
|   |   |   | 4 | N/A | N/A |
|   |   |   | 12 | 263400 | 1.45 |
|   |   |   | 16 | 218100 | 1.44 |

Example 16

This example shows butyl acrylate homopolymerization in the presence of the control agent B-1 (which was prepared as above) and in the absence of control agent.

Freshly prepared n-butyl acrylate (5727 uL) and CTA-3 (68 mg) in three reaction vessels were added with 50 uL, 150 uL, and 300 uL of AIBN stock solution (32.8 mg/mL in toluene), respectively. In addition, a blank reaction with no control agent was prepared with 50 uL of AIBN stock solution. The polymerizations were carried out at 60° C. for 15 hours in glass vessels that were sealed.

The results are reported in Table 2 and conventional GPC was performed on the samples:

TABLE 2

| Entry | AIBN (mole % to B-1) | Mn | Mw/Mn | Conv. (%) |
|---|---|---|---|---|
| 1 | 10 | 2500 | 1.60 | 24 |
| 2 | 30 | 9400 | 1.53 | 50 |
| 3 | 60 | 14200 | 1.51 | 72 |
| 4 | 0.05 mole % of monomer | Crosslinked material | | |

Example 17

Butyl acrylate and Styrene homopolymerization in the presence of the control agent E-1, as shown above.

A stock solution mixture of freshly prepared n-butyl acrylate (5727 uL), control agent E-1 (46.8 mg), and AIBN solution in a concentration of 32.8 mg/mL in toluene (50 uL) was split into 5 glass 4 mL reaction vessels. Another stock solution mixture of freshly prepared Styrene (4577 uL), control agent E-1 (46.8 mg), and AIBN solution in a concentration of 32.8 mg/mL in toluene (50 uL) was also split into 5 glass 4 mL reaction vessels. The polymerizations were carried out at 60° C. and 70° C. for 1 to 22 hours.

The results are reported in Table 3 and conventional GPC was performed on the samples:

TABLE 3

| Entry | Monomer | Temp. (° C.) | Time (h) | Mn | Mw/Mn | Conv. (%) |
|---|---|---|---|---|---|---|
| 1 | n-butyl acrylate | 60 | 2 | 15700 | 1.12 | 70 |
| 2 | n-butyl acrylate | 60 | 4 | 18000 | 1.12 | 86 |
| 3 | n-butyl acrylate | 60 | 15 | 19600 | 1.14 | 94 |
| 4 | n-butyl acrylate | 70 | 1 | 17400 | 1.16 | 85 |
| 5 | n-butyl acrylate | 70 | 15 | 20600 | 1.19 | 97 |
| 6 | Styrene | 60 | 4 | 2900 | 1.47 | 11 |
| 7 | Styrene | 60 | 15 | 5000 | 1.37 | 32 |
| 8 | Styrene | 60 | 22 | 6900 | 1.24 | 47 |
| 9 | Styrene | 70 | 4 | 4300 | 1.40 | 19 |
| 10 | Styrene | 70 | 22 | 6700 | 1.28 | 41 |

It is to be understood that the above description is intended to be illustrative and not restrictive. Many embodiments will be apparent to those of skill in the art upon reading the above description. The scope of the invention should, therefore, be determined not with reference to the above description, but should instead be determined with reference to the appended claims, along with the full scope of equivalents to which such claims are entitled. The disclosures of all articles and references, including patent applications and publications, are incorporated herein by reference for all purposes.

What is claimed is:

1. A compound characterized by the formula:

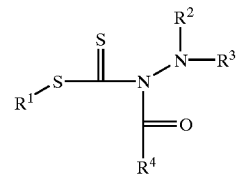

wherein
   $R^1$ is selected from the group consisting of hydrocarbyl, substituted hydrocarbyl, heteroatom-containing hydrocarbyl, and substituted heteroatom-containing hydrocarbyl, and combinations thereof, with the proviso that $R^1$ is not methyl;
   $R^2$ and $R^3$ are each independently selected from the group consisting of hydrogen, hydrocarbyl, substituted hydrocarbyl, heteroatom-containing hydrocarbyl, and substituted heteroatom-containing hydrocarbyl, and combinations thereof, and
   $R^4$ is selected from the group consisting of hydrogen, hydrocarbyl, substituted hydrocarbyl, heteroatom-containing hydrocarbyl, and substituted heteroatom-containing hydrocarbyl, and combinations thereof; and optionally, $R^4$ combines with $R^2$ and/or $R^3$ to form a ring structure, with said ring having from 3 to 50 non-hydrogen atoms.

2. The compound of claim 1, wherein $R^1$ is selected from the group consisting of optionally substituted alkyl, optionally substituted aryl, optionally substituted alkenyl, optionally substituted alkoxy, optionally substituted heterocyclyl, optionally substituted alkylthio, optionally substituted amino and optionally substituted polymer chains.

3. The compound of claim 2, wherein $R^1$ is selected from the group consisting of —$CH_2Ph$, —$CH(CH_3)CO_2CH_2CH_3$, —$CH(CO_2CH_2CH_3)_2$, —$C(CH_3)_2CN$ and —$C(CH_3)_2Ph$.

4. The compound of claim 1, wherein $R^2$ and $R^3$ are each independently selected from the group consisting of hydrogen, optionally substituted alkyl, optionally substituted aryl, optionally substituted alkenyl, optionally substituted acyl, optionally substituted, aroyl, optionally substituted alkoxy, optionally substituted heteroaryl, optionally substituted heterocyclyl, optionally substituted alkylsulfonyl, optionally substituted alkylsulfinyl, optionally substituted alkylphosphonyl, optionally substituted arylsulfinyl, and optionally substituted arylphosphonyl.

* * * * *